(12) United States Patent
Boettiger et al.

(10) Patent No.: US 9,201,798 B2
(45) Date of Patent: Dec. 1, 2015

(54) PROCESSOR INSTRUCTION BASED DATA PREFETCHING

(71) Applicant: International Business Machines Corporation, Armonk, NY (US)

(72) Inventors: Hans Boettiger, Tuebingen (DE); Thilo Maurer, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 14/049,310

(22) Filed: Oct. 9, 2013

(65) Prior Publication Data

US 2014/0108742 A1   Apr. 17, 2014

(30) Foreign Application Priority Data

Oct. 12, 2012   (GB) .................................. 1218305.9

(51) Int. Cl.
G06F 3/00         (2006.01)
G06F 5/00         (2006.01)
G06F 12/08        (2006.01)

(52) U.S. Cl.
CPC .................................. G06F 12/0862 (2013.01)

(58) Field of Classification Search
USPC ......................................................... 710/62
See application file for complete search history.

(56) References Cited

U.S. PATENT DOCUMENTS

| 7,716,426 | B2 | 5/2010 | Ohba |
| 8,806,177 | B2 * | 8/2014 | Krieger et al. ................. 712/207 |
| 2004/0054853 | A1 * | 3/2004 | Sprangle et al. .............. 711/137 |
| 2009/0198909 | A1 * | 8/2009 | Speight et al. ................ 711/137 |
| 2011/0119426 | A1 | 5/2011 | Boyle et al. |
| 2011/0173398 | A1 | 7/2011 | Boyle et al. |
| 2011/0219208 | A1 | 9/2011 | Asaad et al. |
| 2012/0066456 | A1 | 3/2012 | Dubrovin et al. |

OTHER PUBLICATIONS

Briz, Jose et al., Multi-level Adaptive Prefetching based on Performance Gradient Tracking, Journal of Instruction-Level Parallelism 13, Jan. 2011, 1-14.
Dimitrov, Martin et al, Combining Local and Global History for High Performance Data Prefetching, Journal of Instruction-Level Parallelism 13, Jan. 2011, 1-14.

* cited by examiner

Primary Examiner — Chun-Kuan Lee
(74) Attorney, Agent, or Firm — Jeff Tang (57) ABSTRACT

A computer implemented method for prefetching data. The method includes: receiving one or more addresses by a prefetching unit upon execution of an enqueuing command in a first piece of program logic; enqueuing each of the received addresses to a recording-list; identifying one of the positions in the recording-list as jump position; providing the identified jump position to a frame-shifter; using a sub-list of the recording-list defined by a shiftable frame as a playback-list; executing a frame-shift command which triggers the frame-shifter to shift the frame in dependence on the jump position to provide an updated playback-list; fetching data identified by the updated playback-list from a second memory; and transferring the fetched data to a first memory.

17 Claims, 6 Drawing Sheets

FPU: Floating Point Unit
PPC: Power Performance Chip
L1: L1 Cache
L2: L2 Cache
PF: Prefetching Unit

PROCESSOR INSTRUCTION BASED DATA PREFETCHING

CROSS-REFERENCE TO RELATED APPLICATION

This application claims priority under 35 U.S.C. §119 from Patent Application No. GB1218305.9 filed Oct. 12, 2012, the entire contents of which are incorporated herein by reference.

BACKGROUND OF THE INVENTION

1. Field of the Invention

The present invention relates in general to the field of data processing. More particularly, the present invention relates to prefetching data for a processor by means of a processor instruction.

2. Description of the Related Art

Efficient memory management is crucial for allowing a processor to realize its full potential to process data efficiently. Memory management includes dynamically determining data that will probably be required by a processor in future processing steps. The data is fetched in advance into a data cache of the processor ("prefetching"). Several prefetching methods exist having been developed to increase the efficiency of memory management. For example, there exist history based prediction strategies analyzing a history of unsuccessful access trials for predicting which data shall be prefetched. There also exist approaches which evaluate source code annotations for identifying, upon executing the piece of code, addresses that will be required by the program code instructions immediately following the annotations, and for prefetching the addresses.

Processing systems making use of cache memory are well-known. Cache memories are very high-speed memory devices increasing the speed of the processor by making prefetched data available to the processor with a minimum amount of latency. Although cache memory is only a small fraction of the size of the main memory, typically a large fraction of memory requests are successfully found in the fast cache memory, because of the "locality of reference" property of programs. This means that memory references used by a programmer during a given time interval tend to be confined to a few localized areas of memory.

When a processor is to retrieve some required data from the main memory, at first the cache is examined. If the required data is already found in the cache (because it was prefetched), the data is read from the (fast) cache. The (comparatively slow) main memory is not accessed. Only in case the required data is not found in the cache, the main memory is accessed. Thus, ideally, all required data are prefetched far enough in advance so that a copy of the data is already in the fast cache when the processor needs it. The amount of data that can actually be prefetched is limited by the size of the fast cache memory.

BRIEF SUMMARY OF THE INVENTION

The present invention provides a computer implemented method for prefetching data for a processor by a prefetching unit. The method includes: receiving one or more addresses by the prefetching unit, wherein the addresses are provided by the processor executing a first piece of a program logic, the addresses being provided by means of a processor instruction, and wherein the processor instruction being called by an enqueuing command in a first piece of program logic; enqueuing each of the received addresses to a recording-list by the prefetching unit, wherein each enqueued address corresponds to one position in the recording-list; identifying, by the prefetching unit one of the positions in the recording-list as a jump position; providing, by the prefetching unit the identified jump position to a frame-shifter of the prefetching unit; using a sub-list of the recording-list being defined by a shiftable frame as a playback-list; using the frame-shifter, shifting the frame along the recording-list to provide an updated playback-list, wherein the shifting being triggered by an executing of a frame-shift command contained in a second piece of the program logic, and wherein the jump position constitutes the first position of the updated playback-list; fetching data from a second memory, wherein the fetched data is identified by addresses within the updated playback-list; and transferring the fetched data to a first memory, wherein the first and the second memories are caches within a multi-level cache of the processor.

Another aspect of the present invention provides a prefetching unit for prefetching data, including: a first and a second memory; a processor communicatively coupled to the first and second memory; and the prefetching unit being operatively connected to the first and the second memory and the processor, wherein the prefetching unit being adapted to perform the steps of a method including: receiving one or more addresses by the prefetching unit, wherein the addresses are provided by the processor executing a first piece of a program logic, the addresses being provided by means of a processor instruction, and the processor instruction being called by an enqueuing command in the first piece of program logic; enqueuing each of the received addresses to a recording-list by the prefetching unit, wherein each enqueued address corresponds to one position in the recording-list; identifying, by the prefetching unit, one of the positions in the recording-list as jump position; providing, by the prefetching unit, the identified jump position to a frame-shifter of the prefetching unit; using a sub-list of the recording-list being defined by a shiftable frame as a playback-list; using the frame-shifter, shifting the frame along the recording-list as to provide an updated playback-list, wherein the shifting being triggered by an executing of a frame-shift command contained in a second piece of the program logic, and wherein the jump position constitutes the first position of the updated playback-list; fetching data from a second memory, wherein the fetched data is identified by addresses within the updated playback-list; and transferring the fetched data to a first memory.

BRIEF DESCRIPTION OF THE DRAWINGS

The above and other items, features and advantages of the invention will be better understood by reading the following more particular description of embodiments of the invention in conjunction with the figures wherein.

DETAILED DESCRIPTION OF THE PREFERRED EMBODIMENTS

A 'first memory' as used herein is a memory which is used by a processor for caching data. In an embodiment of the present invention, the memory is a volatile memory.

Analogously, a 'second memory' as used herein is a memory that is used by the processor as a cache, wherein the first and second memories constitute or belong to a hierarchy of caches of the processor. The second memory, in an embodiment of the present invention, is a volatile memory. According to the terminology used herein, the first memory is a cache closer to the processor within the cache hierarchy as the second memory. The closeness corresponds to the latency time of the processor requesting data from the memory: the closer the memory, the shorter the latency times. Depending on the embodiment, the first and second memory can respectively be at the first and second positions within the cache hierarchy or can be at any other subsequent positions, e.g. $2^{nd}$ and third, third and fourth, and so on. Typically, the closer a cache lies to the processor in respect to the cache hierarchy, the faster and more expensive the cache and the smaller the cache space.

An address as used herein in an address in the main memory. A 'physical address' is an address of a physical storage unit, in particular a physical storage unit of the main memory. A physical address PA can have the format PA=(f,o), wherein f is the frame number and o is an offset indicating a particular line within the frame f. A 'virtual address' is an address of a virtual address space being mapped to a physical address space. A virtual address VA can have the format VA=(p,o), wherein p is the page number and o is an offset indicating a particular line within the page p. Typically, the offset o of a virtual address VA is identical to the offset o of a physical address PA mapped to said VA. The offset o is also referred to as 'relative address' and is constant within a program logic. The process of address translation for prefetching includes a translation of a relative address (an offset o) into an effective address (including the offset and a page number p). An effective address is calculated at runtime and is constitutes, in combination with additional information such as a context-ID, a corresponding virtual address. An absolute address is an address allowing direct access to the respective memory block(s). A reference-address, as used in relative addressing approaches, is not required. A 'load address' is an address requested by the processor from a memory, in particular, the L1 cache of a processor. A 'store address' is an address which, together with a corresponding piece of datum to be stored, is provided by the processor for storage into the memory, in an embodiment, the L1 cache. Load addresses are temporarily stored in a load address buffer and store addresses are temporarily stored in a store buffer, wherein load buffer and store buffer are managed by a processor independently of each other. A 'recording-list' as used herein is an address list, e.g. a queue or an array, managed by the prefetching unit and used for prefetching data contained in at least some of the enqueued addresses. The 'base address' of a recording-list as used herein is an address in the main memory pointing to the first position of the recording-list. Thus, a recording-list has one respective base address. The recording-list can include a plurality of address sets, wherein each of the sets can refer to a datum (a piece of data) to be prefetched. The first address in the main memory of each of the piece of data to be prefetched is referred to as 'start address' A. A recording-list can correspond to one or more pieces of data to be prefetched and thus correspond to one or more 'start addresses'. A 'frame' as used herein is a window having a fixed number of address position which can be shifted across the recording-list and whereby the addresses in the window constitute the addresses of the playback-list.

A 'program logic' can be the program logic of a complete application program, or can be a piece of the program, e.g. a module, a program script section, a single class object or method contained therein.

A 'processor instruction' as used herein is an instruction being part of the instruction set of a processor. The term does not refer to commands and instructions specified in a piece of program logic. Commands and instructions within a piece of program logic are referred herein as commands. Execution of a command can trigger the execution of one or more corresponding processing instructions. A 'legacy store instruction' as used herein is a store instruction which is already part of the instruction set of the processor as provided by the processor's manufacturer. A store instruction is a memory access instruction used in writing to a storage location of the main memory in response to an address.

In one aspect, the invention relates to a computer implemented method for prefetching data for a processor by a prefetching unit. The method includes:

Receiving one or more addresses by the prefetching unit. The addresses are provided by the processor executing a first piece of a program logic. The addresses are provided to the prefetching unit by means of a processor instruction. The processor instruction is called by an enqueuing command in the first piece of program logic.

Enqueuing each of the received addresses to a recording-list by the prefetching unit. Each enqueued address corresponds to one position in the recording-list.

The prefetching unit identifies one of the positions in the recording-list as jump position.

The prefetching unit provides the identified jump position to a frame-shifter of the prefetching unit.

The prefetching unit uses a sub-list of the recording-list which is defined by a shiftable frame as a playback-list; A playback-list is a list of addresses which identify the data to be prefetched in the next prefetching step.

The processor executes a frame-shift command contained in a second piece of the program logic, the frame-shift command triggering the frame-shifter to shift the frame along the recording-list as to provide an updated playback-list, wherein the jump position constitutes the first position of the updated playback-list.

Fetching data from a second memory, wherein the fetched data is identified by addresses within the updated playback-list.

And transferring the fetched data to a first memory.

The first and second memories are caches within a multi-level cache of the processor. The first memory is at a level of the hierarchy which is closer to the processor than the level of the second memory.

Executing processor instructions for providing addresses of data to be prefetched can be advantageous as the processor instructions can be used by a processor currently executing a program logic for prefetching addresses of data which are indicated within the program logic. The ability to enqueue addresses at any point in time can allow prefetching the required data in advance just in time before the data is actually needed ('just in time'—'JIT' prefetching). The kind of prefetching can even be applicable in cases when no information on past hit- and miss addresses are available. The information on past hit- and miss addresses can be used by 'history based' prefetching approaches for determining the addresses of data to be prefetched. An explicit call to an processor instruction for enqueuing addresses to be prefetched thus allows to prefetch data also in cases where 'history' data is not available. For example, a program logic can include annotations introduced into program source code by a programmer, wherein the annotations include an enqueuing command operable to call the processor instructions. Alternatively, or in addition, a compiler can automatically evaluate a piece of source code during compilation and can insert an enqueuing command into the compiled code in accordance with the evaluation.

Identifying a jump position upon enqueuing addresses in the recording-list can be advantageous as the feature can allow to directly shift the frame to a position in the recording-list including addresses including data to be required in the near future, whereby executing the shift does not require a time consuming search on the recording-list. The shift can therefore also be referred to as 'jump' of the frame to the jump position. This feature can be particularly advantageous in cases where the enqueuing of addresses can follow a different chronological sequence as the execution of respective program logic sections by a processor. For example, in cases a program logic includes a plurality of branches whose chronological sequence of execution cannot be predicted in advance, e.g. due to some complex and dynamically evaluated dependencies and decision steps, the use of a jump position in combination with a frame-shift command in the respective program code sections can allow an efficient data prefetching also in cases where no history data is available and wherein the chronological sequence of executing different pieces of code cannot be predicted in advance.

According to an embodiment, the updated playback-list includes the jump position at its first address position. This means that upon executing a frame shift, the frame is repositioned such that the jump position constitutes the first position of the updated frame.

According to an embodiment, the addresses are load addresses and store addresses. In another embodiment, the addresses include store addresses. Using store addresses alone or in combination with load addresses for the purpose of enqueuing the store addresses in a recording-list can be advantageous as the store addresses are managed in most processor architectures separately from the load addresses. Thus, by solely or at least partially using store addresses rather than load addresses, the load address queue is not affected by the enqueuing process and a halt of the loading of addresses is avoided.

According to an embodiment of the present invention, the prefetching unit is operable to execute the following prefetching method independently of the program-logic driven frame-shifting and prefetching: Receiving at least one current address upon loading the current address by the processor; Comparing the at least one current address with each of the addresses in the playback-list for identifying a first matching address within the playback-list; In case a first matching address is identified, fetching data from the second memory, wherein the fetched data is identified by addresses sequential to the position of the first matching address in the playback-list.

According to an embodiment, load addresses or store addresses of arbitrary sequence or patterns are enqueued for prefetching purposes, whereby the addresses are specified by means of a regular expression that can be evaluated by the prefetching unit.

According to an embodiment, the method includes filtering the addresses before, during or after enqueuing the addresses to the recording-list. The filtering includes removing zero, one or multiple addresses from the addresses to be enqueued and/or already being enqueued in the recording-list. The identification of the jump position is executed after the filtering. For example, some addresses identified by a filter-address range or by applying a filter-address-pattern can be removed from the recording-list to reduce the size of the list by removing data which does not need to be prefetched. Executing the identification of the jump position after the filtering ensures that the jump position is valid, e.g. indicates the address position following the last one of the enqueued and non-filtered out addresses having been enqueued for a particular enqueuing command.

According to an embodiment, the processor instruction is an enqueuing instruction interfacing with the prefetching unit. Executing the enqueuing instruction includes calling the prefetching unit, thereby using at least a start address A and at least one index position i as arguments. The call is executed by the processor executing the enqueuing instruction. The called prefetching unit, upon receiving the arguments, executes: calculating an effective addresses from the arguments for each of the number of arguments; and enqueuing the effective addresses as one or more of the enqueued addresses.

The start address A is the address of a first memory block containing data to be prefetched. The start address is usually a virtual address. Each index position i indicates a position of a data fragment of the data relative to the start address. The index can be, for example, an index of an array processed in the program logic, or an index in any other data structure or data pattern within the program logic including a sequence of address positions.

According to an embodiment, the arguments can include, for example, a length L and/or a stride S. The length L indicating the length of each fragment of the data to be prefetched and the stride is indicative of the distance between the begin of any two of the fragments. Any other kind of argument can be used allowing the prefetching unit to identify one or more addresses given a start address in combination with the arguments. Typically, a fragment includes one or multiple memory units having a minimum size of 1 byte.

In case a prefetching unit with a particular interface shall be used for executing the prefetching, it can be necessary to modify the instruction set of the processor by adding an enqueuing instruction being interoperable with the interface of the prefetching unit. In particular, the interoperability includes the enqueuing instruction being operable to call one or more methods of the prefetching unit via the prefetching unit's interface.

A processor currently executing a piece of program logic is aware of the addresses to be processed next. Typically, the addresses are relative addresses (offsets) of program regions as the relative addresses cannot change during program execution. Relative program locations are compiled into the compiled program logic. The generation of an effective address can include the determination of the page of the VA space including an address processed in the program logic and the combination, e.g., concatenation, of the page number with the offset. The effective address can be used to calculate the corresponding virtual address in a later step. Delegating the calculation of the effective address to the prefetching unit can be advantageous as the processing load of the processor can be reduced and the speed of executing the program logic increased.

According to an embodiment of the present invention, the processor instruction is a legacy store instruction. Legacy store instructions have an interface which include an address argument for receiving an address to be stored (a store address) and have a data argument for receiving data to be stored. The processor can determine a start address A and an index position i as described above. Then, the processor executing the enqueuing command, calls the prefetching unit. Thereby, the determined start address is provided as the address argument to the legacy store instruction. The index position is provided as the data argument to the legacy store instruction.

Each execution of an enqueuing command can trigger the execution of one or more processor instructions (enqueuing instructions or legacy store instructions). The same start address can be used for each of the processor instructions called by the same enqueuing command. One jump position can be identified for each of the processor instructions called.

The prefetching unit includes an address translation unit and the prefetching unit in addition calculates a physical address from the virtual address. For example, an offset register of the processor accessible by the prefetching unit can allow the identification of a physical address including the data to be prefetched for the virtual address. According to an embodiment, the virtual address is specified by a 'page number' and an offset indicating a page line within the page, and a physical address is specified by a 'frame number' and an offset indicating a frame line within the frame, whereby the offset of a virtual address is identical to the offset of a physical address being mapped to the virtual address. Typically, the virtual-to-physical address translation is executed by components of the processor. Delegating the task to a prefetching unit can be advantageous as it can decrease the workload of the processor and increase processing performance.

According to an embodiment, an address determination unit can monitor the arguments received by the legacy store instruction. The address determination unit can calculate one or more effective addresses from the arguments and forward the effective addresses to the prefetching unit. Alternatively, the prefetching unit can monitor the arguments received by the legacy store instruction. In this case, the prefetching unit can calculate the one or more effective addresses from the arguments. After having calculated the effective address(es), the prefetching unit evaluates the calculated effective addresses and determines if the effective addresses should be enqueued as one or more of the enqueued addresses. According to an embodiment of the present invention, the evaluation of the one or more effective addresses includes comparing the effective addresses with an address range.

Using a legacy store instruction can be advantageous as existing hardware architectures can be reused without having to modify the instruction set of a processor for allowing a prefetching of addresses provided by a currently executed program logic to a store buffer of the processor. Only some comparatively easy implementable modifications are required for allowing a redirection of some particular store addresses to the prefetching unit for enqueuing the addresses to the recording-list. For example, the legacy store instruction can be designed as to forward the store addresses and the data to be stored to the second memory, e.g. the L2 cache. The second memory includes some address evaluation logic. The redirecting of addresses can be achieved by modifying the address evaluation logic of the second memory as to redirect a store address received from the executed legacy store instruction to the prefetching unit in case the store address or store addresses matches an address pattern or lie within a particular address range. For example, the second memory logic can determine that the effective addresses lie within a predefined address range and in this case forward the effective addresses to the prefetching unit which enqueues the effective addresses as some of the addresses in the recording-list. Thus, the use of a legacy store instruction not for storage purposes but rather for redirection and prefetching purposes can allow to provide a prefetching functionality with only minor amendments to the hardware architecture.

According to an embodiment, the address evaluation logic of the second memory (or another component receiving the addresses from the legacy storage instruction) evaluates the received effective addresses and forwards the addresses to a translation unit in case the addresses match an address pattern or lie within a particular address range. The translation unit can execute a virtual to physical address translation and forward the physical addresses to the prefetching unit.

According to an embodiment, the evaluation of the one or more effective addresses includes comparing the effective addresses with an address pattern or address range. The comparison can be implemented as a bit-wise comparison of an effective address with a bitmask, wherein the bitmask can specify a single address or an address range which shall be enqueued.

According to an embodiment, at least one of the arguments of the store instruction is used for providing one or more of the following data to the prefetching unit: the address range to be used in the effective address evaluation by the prefetching unit; for example, the address range can be specified in the form of a bitmask; a piece of data operable for initializing, starting, stopping, pausing or resuming the prefetch unit; a piece of data operable for initiating and/or terminating and/or configuring a filtering operation, the filtering operation including removing some addresses from the recording-list in accordance with the filter configuration; for example, the prefetching unit can comprise a MMIO configuration register to configure the prefetching unit; upon execution of a legacy store instruction with a data argument being operable to induce a filter configuration operation, the configuration data can be written to the configuration register; the register can be read by the prefetching unit upon executing a load instructions; at least some of the addresses to be enqueued; the jump position. The thus provided jump position can be written to a MMIO register of the prefetching unit, the register being also referred herein as 'jump register'.

Typically, a store instruction includes an argument for providing the data to be stored to a particular storage address. The argument can be used for providing redirecting- and/or controlling information for specifying the hardware component (prefetch unit of a particular type), the operation mode of the hardware component (e.g. just-in-time, program-logic-based prefetching or a prediction ('history')-based prefetching mode), or the address pattern to be evaluated by the second memory for address redirection or an address range or pattern used by a filtering unit of the prefetching engine for filtering out enqueued addresses from the recording-list which should not be used for prefetching data. Thus, the existing legacy store instructions can be re-used, by means of specific argument values, in a plurality of different and novel ways for enabling just-in-time prefetching without a modification of a processor's instruction set. The piece of data operable for causing the prefetching unit to shift the addresses in the playback-list in accordance with the current address can be, for example, an 'address shift' trigger value in combination with an offset provided to the processor e.g. upon starting execution of a process logic branch and starting enqueuing the addresses to be prefetched for the branch.

Depending on the embodiment of the legacy store instruction based enqueuing approach, the arguments can be provided from the legacy store instruction to the prefetching components via some other hardware components, e.g. the L2 cache, evaluating the argument for acting as routers and redirecting the arguments to the prefetching unit. In another embodiment, the prefetching unit monitors the arguments provided to the store instruction and directly performs the evaluation. Also the calculation of the effective address and/or the virtual to physical address translation is executed by the prefetching unit. According to an embodiment, the store instruction is a data-cache-block-touch instruction.

At least one argument of the store instruction is used for dynamically selecting a prefetching approach to be applied. The method further includes: evaluating the prefetching argument by the prefetching unit; and modifying a configuration of a prefetching unit for setting a prefetching approach indicated by the prefetching argument and/or selecting a prefetching module of the prefetching unit from a plurality of available prefetching modules respectively being operable to execute a module-specific prefetching approach, the selection being executed in dependence on the prefetching argument. The features can allow for a program-logic driven, dynamically adaptable variation of the currently executed prefetching approach.

According to an alternative embodiment, the jump position is stored in at least one storage medium of the prefetching unit. The at least one storage medium is writable by the processor before and during the operation of the prefetching unit. The provision of the identified jump position to the frame-shifter includes storing the identified jump position in the at least one storage medium. The at least one storage medium can include, for example, of one or more MMIO registers. The jump position is thereby stored in a way allowing an assignment of the jump position to the frame-shift-command which, when executed, shall trigger a shift of the frame to the jump position. Upon having reached the frame-shift command when executing the program logic, the frame-shifter reads the jump position assigned to the frame-shift-command from the at least one storage medium and triggers the shifting of the frame by the frame-shifter for providing the updated playback-list.

According to an embodiment, the provision of the identified jump position to the frame-shifter includes returning the identified jump position to the program logic. The program logic assigns the jump position to the frame-shift command which is supposed to trigger, when executed, the shift of the frame to the jump position. The program logic stores the assigned jump position in the main memory. Various implementation variants for this assignment can exist, e.g. assigning each frame shift command a command-ID and storing the returned jump positions in the main memory in association with the command-ID. Upon having reached the frame-shift command assigned to the jump position, the program logic provides the jump position to the frame-shifter of the prefetching unit, thereby triggering the shifting of the frame for providing the updated playback-list. According to an embodiment, the provisioning of the jump position to the frame shifter can be implemented as calling a further processor instruction, thereby providing the jump position as argument to the processor instruction. The further processor instruction can be the legacy store instruction as described above or a specially adapted jump-position-store-instruction added to the instruction set of the processor. The jump position can be provided as address argument of the legacy interface.

According to an embodiment, the recording-list is one of one or more recording-lists managed by the prefetching unit. The prefetching unit includes at least a first and a second MMIO register. The method includes storing the base address of each of the one or more recording-lists in the first MMIO register. Providing the jump position assigned to the frame-shift command to the frame-shifter includes:

storing, by a further processor instruction, the jump position assigned to the frame-shift command into the second MMIO register, the further processor instruction being triggered by the frame-shift command, the jump position being specific for the one recording-list;

the frame-shifter reading the base address of the one recording-list from the first MMIO register and reading the stored jump position from the second MMIO register; and the frame-shifter using the read base address in combination with the read jump position for updating the one recording-list. The features can be advantageous as a plurality of recording-lists and corresponding jump positions can be managed in parallel.

Providing one or more MMIO registers which are—also at runtime of the prefetching unit—writable by the processor for initializing a shifting of the address sequence contained in the playback-list can be advantageous as a low overhead control mechanism on the playback-list and the data prefetching. While in existing prefetching units the processor is solely allowed to control the address sequence loaded from the recording-list into the playback-list (or, in other words, control the shifting of the frame which defines the content of the playback-list), features can provide the processor with a continuous control of the addresses in the playback-list also at runtime of the prefetching unit. No re-initialization of the prefetching unit can be necessary for executing a frame-shift of the playback-list, e.g. for loading all addresses from the recording-list into the playback-list which need to be prefetched for executing a particular one of a plurality of branches.

According to an embodiment the program logic includes a plurality of branches. The sequence of execution of the branches can not be predictable. For at least one of the branches, executing one or more enqueuing commands in accordance with a first chronological sequence can be executed, whereby upon the execution of each enqueuing command a respective set of addresses is enqueued to the recording-list. Thus, the first chronological sequence is a sequence of enqueuing the respective pluralities of addresses. The enqueued addresses can need to be prefetched at a later moment in time, e.g. when entering a branch whose execution is based on a particular set of enqueued addresses. The jump position identified upon executing each of the enqueuing commands can indicate a position in the recording-list directly subsequent to the plurality of addresses enqueued by the respective enqueuing command. Then, the branches can be executed in a second chronological sequence which can be identical or can differ from the first chronological sequence. At least one of the branches can include a frame-shift command, preferentially at the begin of the branch, which is assigned to one of the jump positions. When executing the branch, the jump position is used for shifting the frame. Thus, the frame shift commands contained in one or more of the branches are executed in accordance with the second chronological sequence for prefetching the set of addresses required for each one of the branches. Thus, the execution of a frame-shift-command at the begin of a currently executed branch will trigger a frame shift which results in the prefetching of a particular set of addresses which include the data required by the current branch. The features can be advantageous as a time consuming address search within the addresses of the recording-list or the playback-list can be avoided.

For example, a program logic can include an annotation forcing the enqueuing of a particular set of addresses. A set can include one or more addresses. Although the processor or compiler can 'know' how many addresses are enqueued into the recording-list for the particular branch, the number of enqueued addresses remaining in the recording-list after the filtering step is unknown and the boundaries by the branch-specific address subsets are therefore also not known to the processor. A time-consuming search for the respective end-position of the addresses of a particular branch in the recording- and playback-list can be necessary. Using jump position and jump-address-based frame-shift commands in the program logic can allow to dynamically update the content of the playback-list in dependence on the currently executed piece of program logic and can allow an accurate just-in-time prefetching for branched applications with unpredictable behavior.

According to an embodiment the method further includes writing the recording-list to a pre-allocated memory area. The pre-allocated memory area is a ring-buffer. The using of a sub-list of the recording-list as the playback-list includes reading a sub-list of addresses of the recording-list from the pre-allocated memory area into a prefetching unit internal storage. A 'ring buffer' or 'circular buffer' is a data structure that uses a single, fixed-size buffer as if it were connected end-to-end: it allows the buffering of data streams, whereby after having reached the capacity of the ring buffer, any surplus data to be stored in the ring buffer overwrite the parts of the buffer including the oldest data portions. Thus, outdated address data can be automatically overwritten.

According to an embodiment the first memory is an L1 data cache of the processor and wherein the second memory is an L2 data cache of the processor.

In a further aspect, the invention relates to a computer-readable medium including computer-readable program code embodied therewith which, when executed by a prefetching unit in interoperation with a processor, cause the prefetching unit to execute a method according to the above embodiments. Some sections of the code implementing the computer-implemented method described can be performed by the processor or the prefetching unit or another processing component operatively coupled to the medium in accordance with an above embodiments.

In a further aspect, the invention relates to a prefetching unit of a processor. The prefetching unit being operatively connected to a first and a second memory. The first and the second memory are caches within a multi-level cache of the processor. The first memory is at a level of the hierarchy which is closer to the processor than the level of the second memory. The prefetching unit is adapted for: receiving one or more addresses by the prefetching unit, wherein the addresses are provided by the processor executing a first piece of a program logic, the addresses being provided by means of a processor instruction, the processor instruction being called by an enqueuing command in the first piece of program logic; the prefetching unit enqueuing each of the addresses to a recording-list, each enqueued address corresponding to one position in the recording-list; the prefetching unit identifying one of the positions in the recording-list as jump position; the prefetching unit providing the identified jump position to a frame-shifter of the prefetching unit; using a sub-list of the recording-list being defined by a shiftable frame as a playback-list; the frame-shifter shifting the frame along the recording-list as to provide an updated playback-list, the shifting being triggered by an executing of a frame-shift command contained in a second piece of the program logic, wherein the jump position constitutes the first position of the updated playback-list; fetching data from a second memory, wherein the fetched data is identified by addresses within the updated playback-list; and transferring the fetched data to a first memory.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon. Any combination of one or more computer readable medium(s) can be utilized. The computer readable medium can be a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device. Program code embodied on a computer readable medium can be transmitted using any appropriate medium, including but not limited to wireless, wireline, optical fiber cable, RF, etc., or any suitable combination of the foregoing. Computer program code for carrying out operations for aspects of the present invention can be written in any combination of one or more programming languages, including an object oriented programming language such as Java, Smalltalk, C++, a functional programming language such as Haskell, F#.NET or the like and conventional procedural programming languages, such as the "C" programming language or similar programming languages. The program code can also be embodied as firmware. Aspects of the present invention are described below with reference to embodiments of the invention depicted in the figures. It will be understood that the block of the diagrams can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the blocks. These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the blocks of the diagrams.

Figure 1:
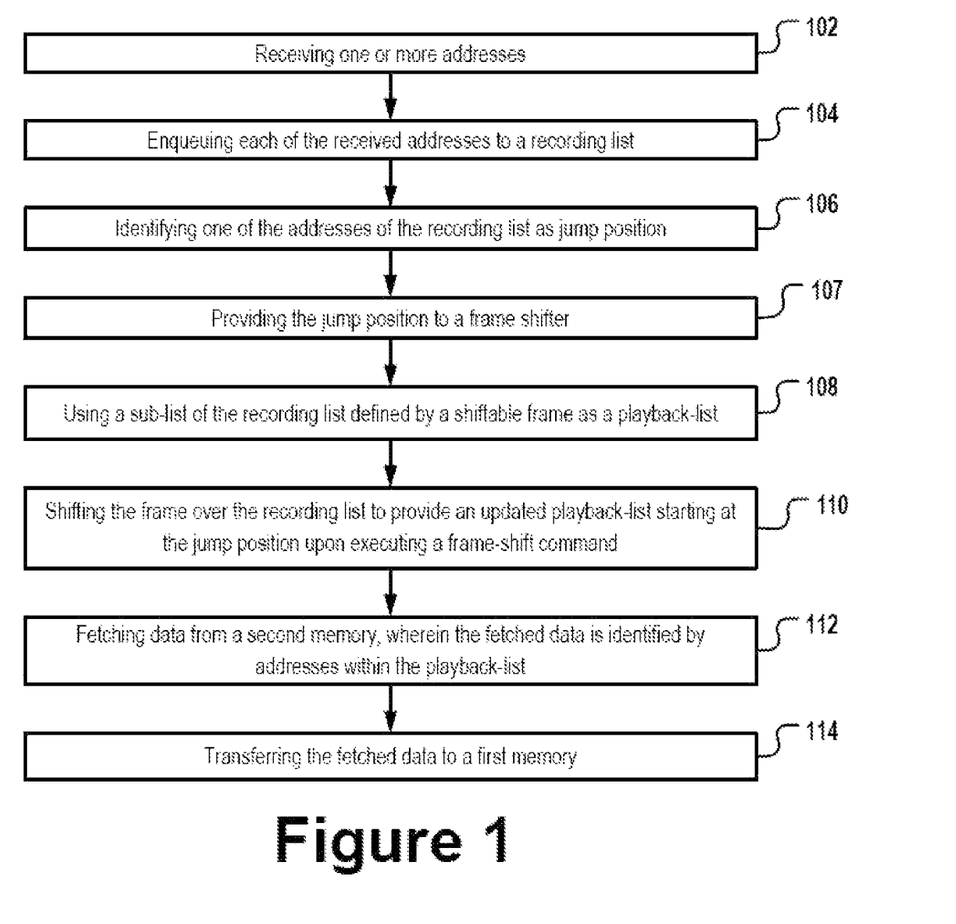
FIG. 1 is a flow-chart of a method for prefetching data.

FIG. 1 depicts a flowchart of a method for prefetching data. Where appropriate, references to FIGS. 3 and 4 will be used in the description of FIG. 1. The method can be applied, as shown in FIG. 4, by a prefetching unit (PF) 304 operatively coupled to a processor 204. 'Prefetching' means loading data that will be required by a processor in advance into the first memory, e.g. the L1 cache. The method requires that the executed program logic includes an explicit enqueuing command which specifies, e.g. by means of a regular expression, the addresses to be enqueued in a recording-list. The enqueuing command can be manually introduced by a programmer or can be automatically introduced to the program logic by a compiler or other program.

The processor executes a piece of program logic including an enqueuing command. Upon execution of the command, the addresses to be enqueued are provided to a PF 304 as a continuous stream of addresses. In FIG. 1, step 102, the PF receives the address stream and in step 104 enqueues the addresses in the stream to a recording-list 408.1. A filtering step can filter out some of the addresses for reducing the size of the recording-list. In step 106, the PF identifies one of the addresses in the recording-list as a jump position (JP). The JP can indicate the end of the address sequence enqueued by the enqueuing command. For example, the enqueuing command can provide a stream of hundred addresses to the PF in step 102. A filtering step can reduce the number of actually enqueued addresses to 80 addresses. The JP identified by the enqueuing unit for the enqueuing command can be the address position within the recording-list immediately following the last address having been enqueued by the enqueuing command. In this case, the JP can be 81 (starting from the first address position of the recording-list). The identified JP is provided to the frame shifter in step 107. In step 108, a sub-list of the recording-list is used as a playback-list. The number and identity of addresses contained in the sub-list is specified by means of a shiftable frame. In step 110, the frame-shifter shifts the frame as a consequence of the processor executing a frame-shift command contained in another piece of the program logic. The frame-shifter uses the identified JP for executing the shift and for updating the addresses contained in the playback-list. In step 112, data is fetched from a second memory into the PF. The fetched data is thereby identified by the addresses contained in the updated playback-list. In step 114, the fetched data is transferred from the PF to the first memory via a push or pull method. Typically, the JP used in a particular frame-shift command indicates the position of the first one of a sequence of addresses in the recording-list whose data is required for executing the program logic immediately following the frame-shift-command. The JP allows quickly executing a frame shift and subsequent fetch step as to provide the required data without having to search the recording-list for the appropriate addresses.

Figure 2:
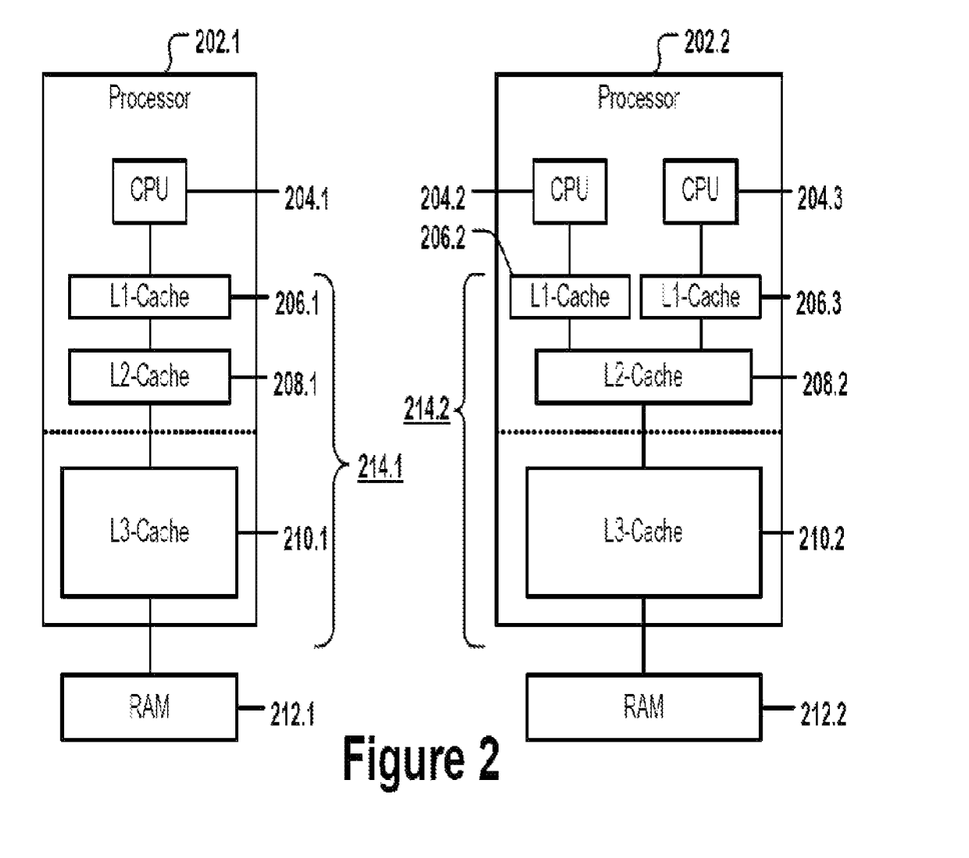
FIG. 2 shows a single-core and a dual-core processor with a multi-level cache hierarchy.

FIG. 2 depicts a single core processor 202.1 and a dual core processor 202.2. Each of the processing cores 204.1, 204.2, 204.3 has assigned exactly one L1 cache 206.1-206.3. The L1 cache is part of a hierarchical cache system 214.1, 214.2 including an L1, L2 and L3 cache. The processing cores 204.2, 204.3 of the dual core processor 202.2 share the L2 cache 208.2 and the L3 cache 210.2. The main memory 212.1, 212.2 as depicted here is not part of the cache hierarchy.

Figure 3:
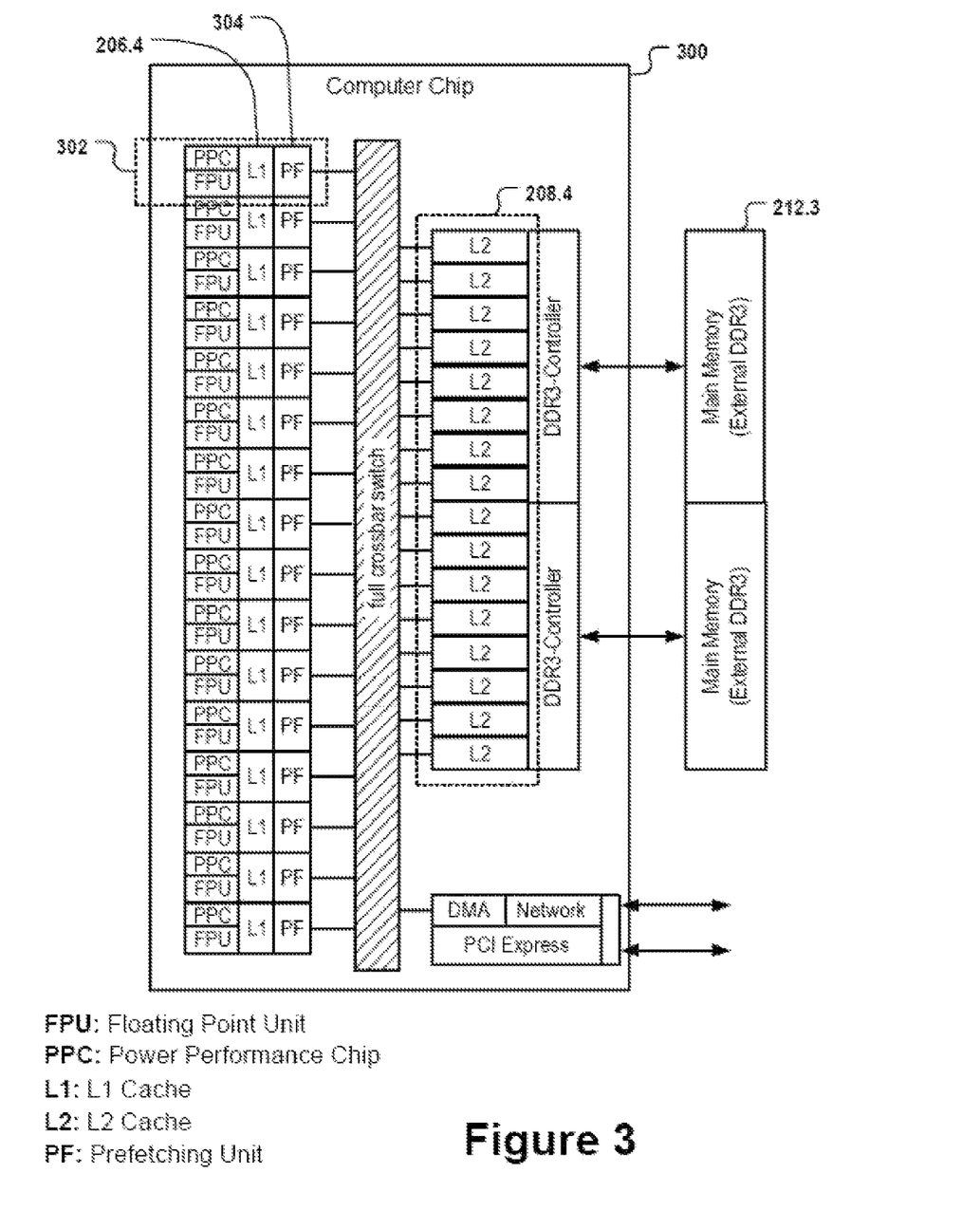
FIG. 3 shows a multi-processor chip including one prefetching unit per processor in greater detail.
Figure 4:
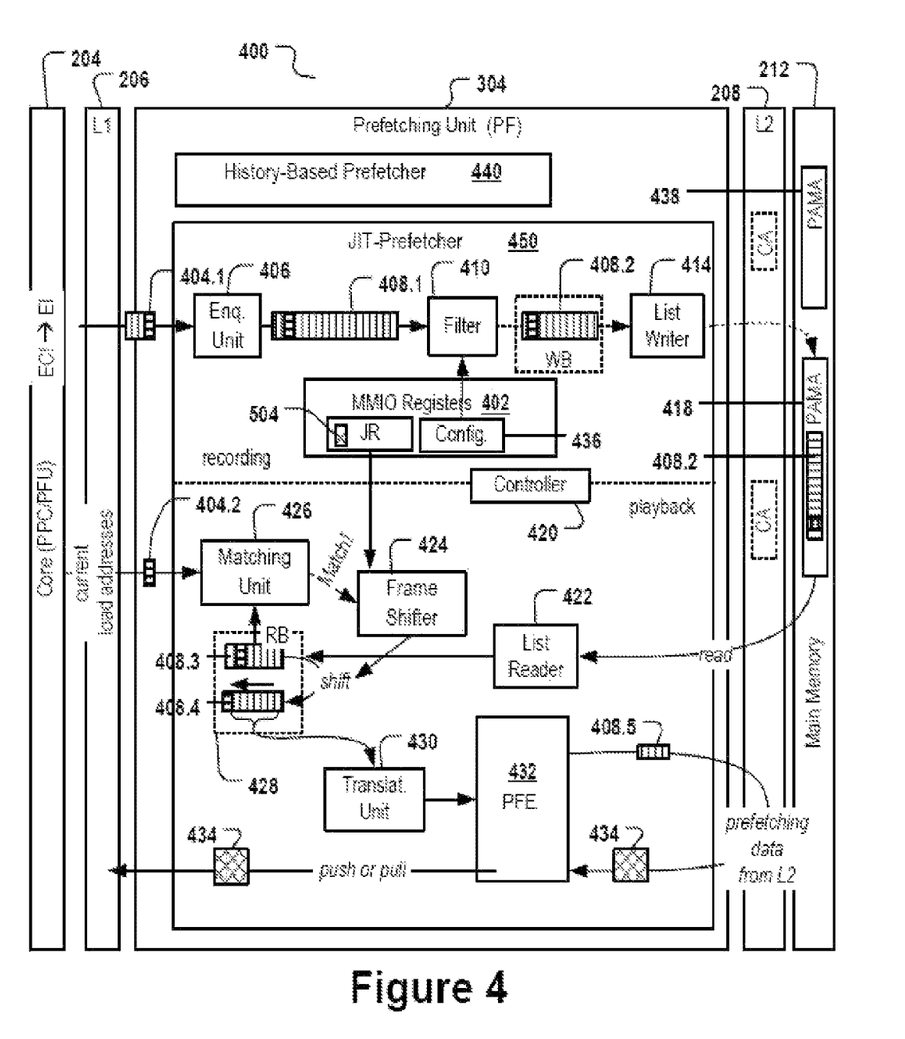
FIG. 4 depicts a prefetching unit in greater detail.

FIG. 3 depicts computer chip 300 of a BlueGene/Q Compute Chip including a plurality of processing units 302. Each processing unit includes a power performance chip PPC, a floating-point unit FPU, an L1 cache 206.4 and a PFU 304.

The PF is operatively coupled to its respective L1 cache, its respective processor PPC and to an L2 cache shared by multiple processing units. The L2 cache 208.4 is coupled via a DDR3 controller to the main memory 212.3. Components of the processing unit 302, the L2 cache 208.4 and the main memory 212.3 largely corresponding in functional terms to elements of FIG. 4 are referred in FIG. 4 by identical numbers.

FIG. 4 depicts a PF 304 which is used for prefetching data currently stored in the L2 cache 208 to the L1 cache 206 of a processor 204. The processor can be a processing core of a multicore processor. The PF 304 can include a 'history-based prefetcher' 440, also referred to as 'list based prefetching module'. A controller 420 controls the operation and interaction of the components of the PF 304 such as a filter unit 410, an enqueuing (Enq.) unit 406, a list writer 414, a matching unit 426, a frame shifter 424, a list reader 422, a prefetching engine (PFE) 432, and, if present, also a translation (translat.) unit 430. The recording-list can for example be stored in a pre-allocated memory area (PAMA) of the main memory. This can be advantageous as the recording-list can be of arbitrary length—potentially larger than the first memory. The list reader 422 is operable to read a playback-list including a subset of the filtered addresses of the recording-list into a read buffer RB. The list reader 422 is responsible for reading from the PAMA 418 a sub-list including a sub-set of addresses from the recording-list (WB) 408.2. This sub-list is called "playback-list". The read playback-list (RB) 408.3 is stored in a read buffer 428 accessible by the matching unit 426. The list writer 414 is responsible for storing the filtered list 408.2 in the PAMA. The writing is executed at the latest when the write buffer is full. As the PAMA can be much larger than the write buffer, the list writer can append, by each write operation, the content of the write buffer or parts thereof to an already stored recording-list 408.2 in the PAMA, thereby creating a recording-list 408.2 in the PAMA that is much longer than the maximum content of the write buffer or read buffer. According to some implementation variants, sub-lists of the recording-lists stored in the first and second PAMAs 418, 438 can be cached in the second memory in respective cache areas CAs and the list reader and list writer can work on the CAs instead of the PAMAs. For the sake of simplicity, the implementation variants are not described in detail here: at the end, also in the implementation variants, the recording-lists which are the basis for the caching and are stored in the main memory.

The controller can coordinate the list writer and list reader to access the correct one of the two PAMAs 418, 438. The enqueuing unit 406 is responsible for receiving the stream of addresses and enqueuing the received addresses into the recording-list 408.1. The stream of addresses is received upon execution of an enqueuing command (EC) in the program logic by the processor which triggers the execution of a store instruction of the processor 204, e.g. an enqueuing instruction (EI) interfacing with the PF.

The filtering unit 410 is responsible for reducing the size of the recording-list 408.1 by applying some filtering procedures based on address patterns and intervals as specified in the filtering configuration 436. The filtering unit outputs a filtered list of addresses 408.2 and stores the list into a write buffer WB. For example, a filter-address-pattern stored in the configuration of the PF can indicate that all even addresses following a particular address at the beginning of the loop can be required by the processor while the odd addresses are never evaluated by the processor and can therefore be filtered out from the list 408.2.

The PF is operable to execute a match-based frame shifting and prefetching in addition to and independently from a frame-shift-command based frame-shifting and prefetching. The matching unit 426 is responsible for the match-based prefetching.

The matching unit compares one or more current addresses 404.2 with each of the addresses contained in the playback-list 408.3. The matching process is started beginning at the first (e.g. leftmost) position of the playback-list and continued through the playback-list (e.g. from left to right) until a matching address is found or until the end of the playback-list is reached. A match can be found e.g. when a currently requested ('current') address is found in the playback-list. In this case, a frame-shifter 424 shifts all addresses of the playback-list following the matching address forward in the playback-list (to the left). Thereby, all addresses having been enqueued earlier than the matching address as well as the matching address itself are overwritten in the playback-list by the shifted addresses. The empty address positions in the playback-list are filled with consecutive addresses from the recording-list 408.2 stored in the PAMA, thereby generating an updated, shifted playback-list 408.4. After having updated the playback-list, all addresses in the playback-list are transferred to a prefetching engine 432. The prefetching engine fetches data identified by the addresses in the playback-list from the L2 cache and stores the data into a prefetch engine-internal memory.

The prefetch engine can actively transfer the data to the processor (push). Alternatively, the processor can actively fetch the data from the prefetch engine-internal memory (pull). The MMIO register 402 includes a configuration 436 of several components of the PF and can also include a JP having been identified by the PF after having enqueued some addresses into the recording-list. In fact, the MMIO register can consist of multiple registers, e.g. one for storing the configuration, one for storing absolute addresses of a plurality of recording-lists and a further register for storing list-specific JPs having been identified in the recording-lists. The matching unit is operable to receive a currently requested current address 404.2 from the processor and to compare the current address with each address in the playback-list for identifying an identical address referred herein as 'matching address'. The comparison is executed "from left to right", i.e., starting with the first address in the playback-list 408.3 having been enqueued to the list 408.1. The current address is a load address which can be a miss address or a hit address or an address of unknown status. In case a matching address is identified in the list, the frame shifter 424 shifts the addresses in the playback-list following the matching address to the starting position in the playback-list (first position at the left side of the list in FIG. 4) and fills the empty places with addresses from the recording-list in the PAMA. As a result, a shifted, updated playback-list 408.4 is generated. The addresses in the updated playback-list 408.4 are transferred directly to the prefetching engine 432 or can be transferred to a translation unit 430 first in order to transform the addresses from virtual to physical addresses 408.5. The prefetching engine caches the data 434 identified by the addresses in the playback-list 408.5 into a prefetching engine-internal storage from where the data is transferred to the processor via a push or pull method. The addresses enqueued in the recording-list can contain a datum D to be prefetched. The datum is describable by means of an address pattern.

The address pattern can be provided to the storage instruction in the form of one or more arguments. The address pattern can specify addresses constituting one or more data fragments of datum D. The fragment can be, for example, the elements of a data structure such as an array, or can be a subset thereof, e.g. all even array elements. Each fragment of the datum D can be a single address or an address interval including a fixed number of consecutive addresses. The address pattern can be specified, for example, by a 'start address' A of the datum D, and a number N being indicative of the number of data fragments consecutively following the start address A, the fragment having a fixed size L. The start address is the first address of a main memory area including the N fragments and the datum D. The start address can be a virtual address specified in the address space 'known' to a currently executed piece of program logic. The address pattern can also be specified, in a more complex manner by means of the 'start address' A, the index i, a data fragment size L, and a stride S. The start address is an address 'known' to the program logic and being requested by the processor currently executing the program logic. The stride indicates the distance between the begin of any two of the fragments. Each fragment can include one or more addresses. Thus, in case the stride S is equal to L, the fragments are directly consecutive. In case S is larger than L, the fragments are not consecutive but rather are separated by one or more other data fragments not being part of the datum D. A number N can be indicative of the number of data fragments consecutively following the start address A in the data structure. In mathematical terms, an address pattern P can be a set of addresses that is given by the union of all address intervals $[A+i*S, \ldots, A+i*S+L[$ for all i within $[0, \ldots, N[: P=U\{[A+i*S, \ldots, A+i*S+L[|i [0, \ldots, N[\}$.

Figure 5A:
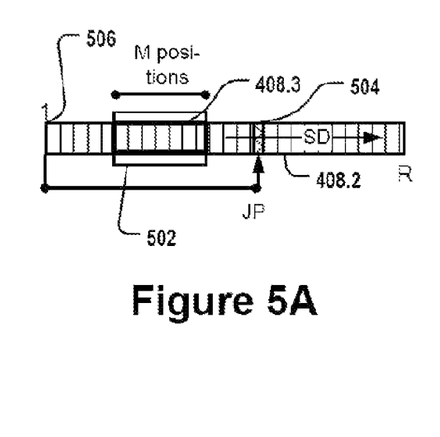
FIGS. 5A and 5B depict a frame shifted over a recording-list.
Figure 5B:
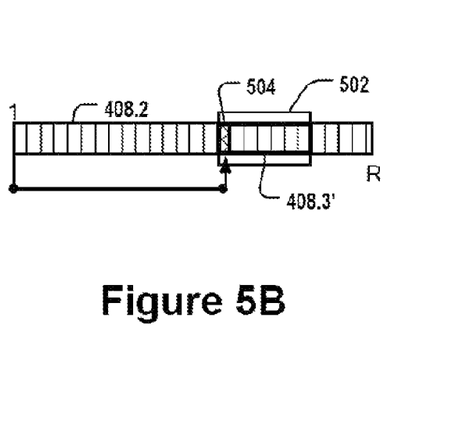

FIG. 5A depicts a recording-list 408.3 having a shiftable frame 502. The frame emborders an address sub-list constituting the playback-list 408.3. The playback-list includes a fixed number of M positions. The recording-list depicted in FIG. 5 includes a number of R addresses which can dynamically be extended. In case a JP 504 is provided as an argument of a frame shifting command, the frame has to be shifted in the indicated direction SD until the JP constitutes the starting position of the frame as depicted in FIG. 5B. The shifted frame of FIG. 5B constitutes an updated playback-list 408.3' which is used for prefetching data indicated by the addresses in the updated playback-list.

Figure 6:
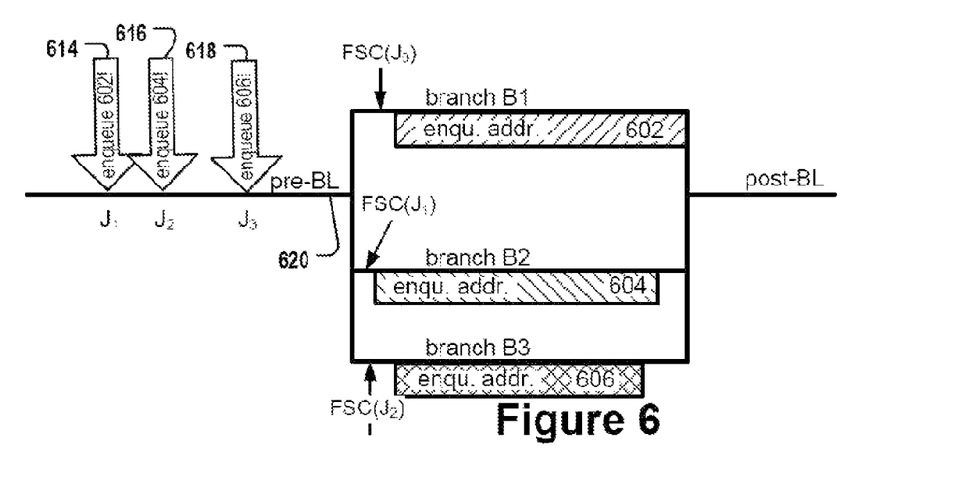
FIG. 6 depicts a process logic including three branches.

FIG. 6 shows a program logic including a piece of program logic referred to as 'pre-branch logic' (pre-BL). The pre-BL includes three enqueuing commands 614, 616 and 618. The program logic further includes a first branch B1, a second branch B2 and a third branch B3 whose sequence of execution can depend on a dynamically calculated value. Thus, the sequence of execution can not be predictable. In addition, the program logic includes a post-branch logic (post-BL) which is executed after all three branches B1-B3 have completed execution. Enqueuing command 614 is a command for enqueuing addresses 602 which are specified in the enqueuing command for branch B1 into a recording-list. Enqueuing command 616 is a command for enqueuing addresses 604. Enqueuing command 618 is a command for enqueuing addresses 606. Thus, at the moment when the processor reaches point 620 in the program logic, the addresses of the branches B1, B2 and B3 have already been enqueued to the recording-list in the order 602|604|606 in accordance with the order of enqueuing commands 614|616|618.

Figure 7:
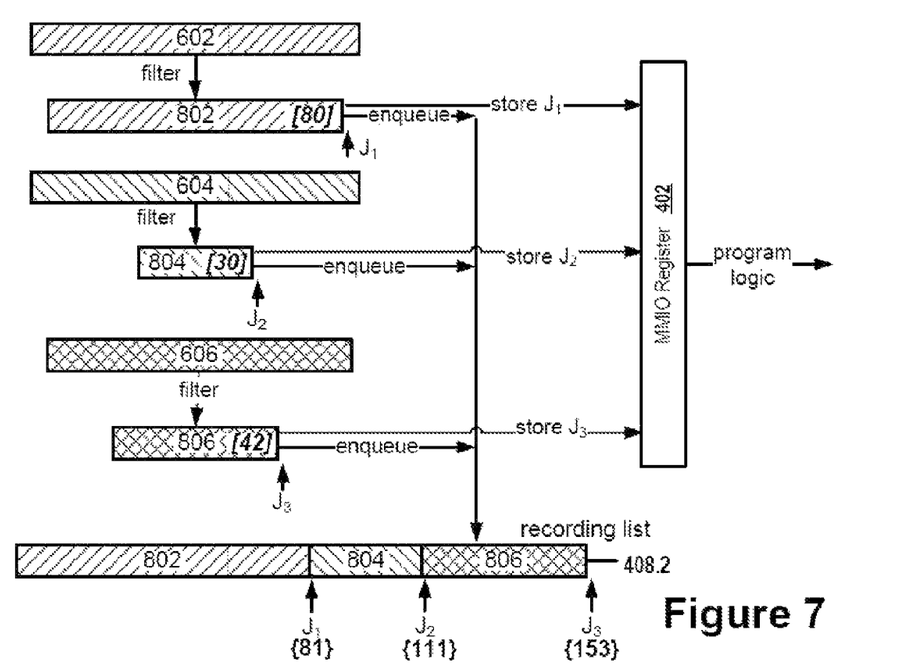
FIG. 7 depicts a filtering and enqueuing of addresses required by the branches into a recording-list.

FIG. 7 shows the process of enqueuing the addresses described in FIG. 6 in greater detail, wherein the enqueuing also includes a filtering of addresses not required by the processor for executing a piece of program logic. After applying the filtering on the plurality of addresses 602 of branch B1, 80 non-filtered out addresses are enqueued in the recording-list 408.2. A corresponding JP J1 is determined, e.g. as a relative address in respect to the start of the recording-list. J1 can be determined as the address in the recording-list directly succeeding the last one of the 80 enqueued addresses. In this case, J1 can be 81. In the following, the number of non-filtered out addresses is given in bold, italic fonts surrounded by square brackets and the respectively determined JP is given in bold fonts surrounded by curly brackets. The JPs having been identified by the PF for the respective enqueuing commands are returned to the program logic and stored to the MMIO register 402 (FIG. 4). In total, the number of non-filtered out actresses having been enqueued for the branches B1, B2 and B3 is 80+30+42=152 and the JPs for the respective enqueuing commands are 81, 111 and 153. The JPs are returned by the PF to the program logic. More particularly, they are returned to allow the program logic, when executing one of the frame-shift commands, to execute a frame shift that updates the playback-list in a way that it includes the addresses required for executing the program logic following the frame-shift command. Thus, each frame-shift command can have assigned a respective enqueuing command and can receive a JP determined at runtime of the PF from the assigned enqueuing command.

Figure 8:
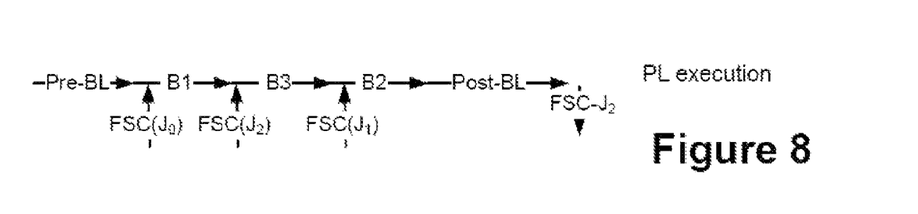
FIG. 8 depicts a sequence of executing branches which deviates from the sequence depicted in FIG. 7 for enqueuing the branch-specific addresses.

FIG. 8 shows a chronological sequence according to which the program logic of FIG. 6 can possibly be executed. According to the depicted branch execution sequence, at first branch B1 is executed, followed by branches B3 and B2. When starting executing branch B3, the frame-shift command FSC (J2) is executed (see also FIG. 6). The command causes a shifting of the frame 502, as depicted in FIG. 5, and an update of the playback-list. The updated playback-list includes address J2=111, shown in FIG. 7, at its first position. Provided that all the addresses 806 fit into the updated playback-list, a fetch executed on the updated playback-list will provide all the addresses 608 required for executing branch B3 to the processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for prefetching data for a processor by a prefetching unit, the method comprising:
   receiving one or more addresses by the prefetching unit, wherein the addresses are provided by the processor executing a first piece of a program logic, the addresses being provided by means of a processor instruction, and wherein the processor instruction is called by an enqueuing command in a first piece of program logic;
   enqueuing each of the addresses to a recording-list by the prefetching unit, wherein each enqueued address corresponds to one position in the recording-list;
   identifying, by the prefetching unit one of the positions in the recording-list as a jump position;
   providing, by the prefetching unit the identified jump position to a frame-shifter of the prefetching unit;
   using a sub-list of the recording-list being defined by a shiftable frame as a playback-list;
   shifting the frame along the recording-list by the frame-shifter to provide an updated playback-list, wherein the shifting is triggered by executing of a frame-shift command contained in a second piece of the program logic and wherein the jump position constitutes the first position of the updated playback-list;
   fetching data from a second memory, wherein the fetched data is identified by addresses within the updated playback-list; and
   transferring the fetched data to a first memory, wherein the first and the second memories are caches within a multi-level cache of the processor.

2. The computer implemented method of claim 1, further comprising: filtering the addresses before, during and/or after enqueuing the addresses to the recording-list, thereby removing zero, one, or multiple ones of the addresses, wherein the identification of the jump position is executed after the filtering.

3. The computer implemented method of claim 1, wherein the processor instruction is an enqueuing instruction interfacing with the prefetching unit, and execution of the enqueuing instruction comprises:
   calling, by the processor executing the enqueuing instruction, the prefetching unit, thereby using at least a start address and at least one index position as arguments, wherein the start address is the address of a first memory block containing data to be prefetched, and wherein each index position indicates a position of a data fragment of the first memory block to be prefetched relative to the start address;
   receiving, by the called prefetching unit, the arguments;
   calculating an effective addresses from the arguments for each of the number of arguments; and
   enqueuing the effective addresses as one or more of the enqueued addresses.

4. The computer implemented method of claim 1, wherein the processor instruction is a legacy store instruction having an interface comprising an address argument for receiving a store address and a data argument for receiving data to be stored, wherein executing the legacy store instruction comprises:
   calling, by the processor executing the legacy store instruction, the prefetching unit, thereby providing a start address as the address argument and providing one index position as the data argument to the legacy store instruction, wherein the start address is the address of a first memory block containing data to be prefetched, wherein the index position indicates a position of a data fragment of the first memory block to be prefetched relative to the start address, and wherein an address determination unit monitors the arguments received by the legacy store instruction and calculates one or more effective addresses from the arguments and forwards the effective addresses to the prefetching unit; or wherein the prefetching unit monitors the arguments received by the legacy store instruction and calculates one or more effective addresses from the arguments; and
   evaluating, by the prefetching unit, the effective addresses for determining if the effective addresses should be enqueued as one or more of the enqueued addresses.

5. The computer implemented method of claim 4, wherein at least one argument of the processor instruction is used to provide data to the prefetching unit, the data comprising:
   address range to be used in the effective address evaluation;
   piece of data operable for initializing, starting, stopping, pausing or resuming the prefetch unit;
   piece of data operable for initiating and/or terminating and/or configuring a filtering operation, the filtering operation comprising removing some addresses from the recording-list in accordance with the filter configuration;

at least some of the addresses to be enqueued; and/or
the jump position.

6. The computer implemented method of claim 1, further comprising:
   evaluating the prefetching argument by the prefetching unit; and
   modifying a configuration of a prefetching unit for setting a prefetching approach indicated by the prefetching argument and/or selecting a prefetching module of the prefetching unit from a plurality of available prefetching modules respectively being operable to execute a module-specific prefetching approach, the selection being executed in dependence on the prefetching argument;
   wherein at least one argument of the store instruction is used for dynamically selecting a prefetching approach to be applied.

7. The computer implemented method of claim 1, wherein the prefetching unit comprises:
   at least one storage medium being writable by the processor before and during the operation of the prefetching unit.

8. The computer implemented method of claim 1, wherein the providing of the identified jump position to the frame-shifter comprises:
   storing the identified jump position in the at least one storage medium, the jump position being stored in a way allowing an assignment of the jump position to the frame-shift-command;
   reading, by the frame-shifter upon having reached the frame-shift command, the jump position assigned to the frame-shift-command from the at least one storage medium; and
   triggering the shifting of the frame by the frame-shifter for providing the updated playback-list.

9. The computer implemented method of claim 1, wherein the step of providing of the identified jump position to the frame-shifter comprises:
   returning the identified jump position to the program logic;
   assigning the jump position to the frame-shift command and storing the assigned jump position in the main memory; and
   providing, upon having reached the frame-shift command, the jump position assigned to the frame-shift command to the frame-shifter of the prefetching unit, thereby triggering the shifting of the frame for providing the updated playback-list.

10. The computer implemented method of claim 9, further comprising:
    managing the one or more recording-lists by the prefetching unit;
    having at least a first and a second MMIO register in the prefetching unit; and
    storing the base address of each of the one or more recording-lists in the first MMIO register.

11. The computer implemented method of claim 10, wherein the step of providing the jump position assigned to the frame-shift command to the frame-shifter comprises:
    storing, by a further processor instruction, the jump position assigned to the frame-shift command into the second MMIO register, the further processor instruction being triggered by the frame-shift command, the jump position being specific for the one recording-list;
    reading the base address of the one recording-list from the first MMIO register and reading the stored jump position from the second MMIO register by the frame-shifter; and
    using the read base address in combination with the read jump position for updating the one recording-list.

12. The computer implemented method of claim 1, wherein the program logic comprises a plurality of branches, the method further comprising:
    executing, for at least one of the branches, one or more enqueuing commands in accordance with a first chronological sequence, wherein upon the execution of each enqueuing command a respective set of addresses is enqueued to the recording-list and wherein at least one jump position is identified upon execution of each enqueuing command; and
    executing the branches in a second chronological sequence being identical to or deviating from the first chronological sequence, whereby upon executing a frame-shift command contained in one or more of the branches, a jump position assigned to the frame-shift-command is used by the processor for shifting the frame in accordance with the second chronological sequence.

13. The computer implemented method of claim 1, wherein the identification of the jump position comprises:
    determining a position in the recording-list directly succeeding the last one of the addresses enqueued upon execution of the enqueuing command; and
    using the determined position as the jump position.

14. The computer implemented method of claim 1, further comprising:
    writing the recording-list to a pre-allocated memory area;
    wherein the using of a sub-list of the recording-list as the playback-list comprises reading a sub-list of addresses of the recording-list from the pre-allocated memory area into a prefetching unit internal storage; and
    wherein the pre-allocated memory area is a ring-buffer.

15. The computer implemented method of claim 1, wherein the first memory is an L1 data cache of the processor and wherein the second memory is an L2 data cache of the processor.

16. A non-transitory computer-readable storage medium comprising computer-readable program code embodied therewith which, when executed by a prefetching unit in interoperation with a processor, causes the prefetching unit to execute the steps of a method according to claim 1.

17. A prefetching unit for prefetching data, comprising:
    a first and a second memory; and
    a processor communicatively coupled to the first and second memory, wherein the first and the second memories are caches within a multi-level cache of the processor; the prefetching unit being operatively connected to the first, the second memory, and the processor, wherein the prefetching unit is adapted to perform the steps of a method, comprising:
    receiving one or more addresses by the prefetching unit, wherein the addresses are provided by the processor executing a first piece of a program logic, the addresses being provided by means of a processor instruction, and the processor instruction being called by an enqueuing command in the first piece of program logic;
    enqueuing each of the received addresses to a recording-list by the prefetching unit, wherein each enqueued address corresponds to one position in the recording-list;
    identifying, by the prefetching unit, one of the positions in the recording-list as jump position;
    providing, by the prefetching unit, the identified jump position to a frame-shifter of the prefetching unit;
    using a sub-list of the recording-list being defined by a shiftable frame as a playback-list;

using the frame-shifter, shifting the frame along the recording-list as to provide an updated playback-list, wherein the shifting being triggered by an executing of a frame-shift command contained in a second piece of the program logic, and wherein the jump position constitutes the first position of the updated playback-list;

fetching data from a second memory, wherein the fetched data is identified by addresses within the updated playback-list; and transferring the fetched data to a first memory.

* * * * *